Nov. 10, 1970     J. G. SMITH     3,538,605
CLIP-ON HAND GUARD FOR KNIVES
Filed April 25, 1968
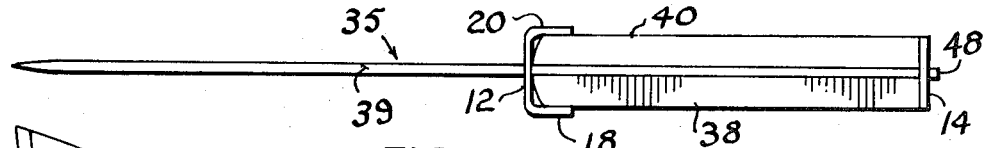
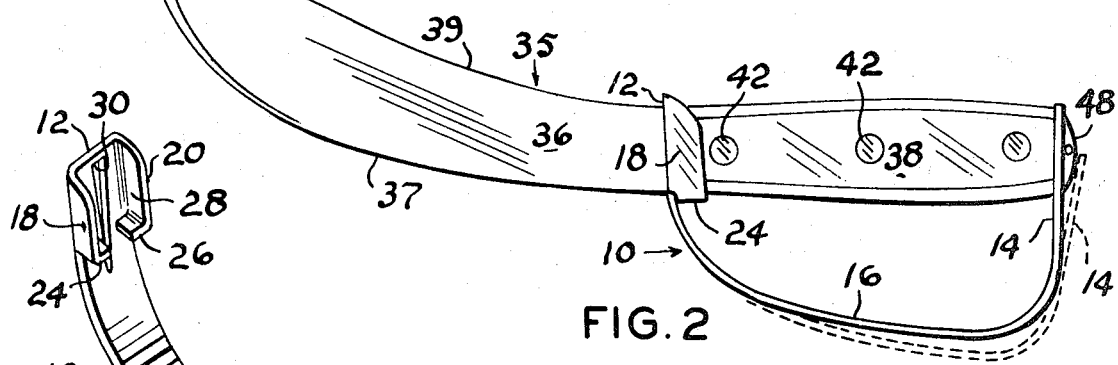
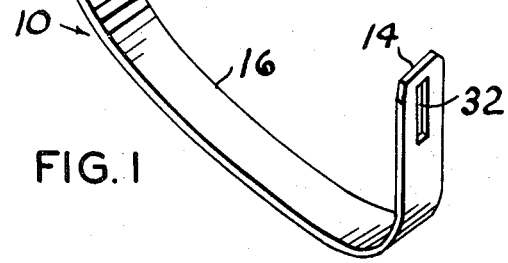
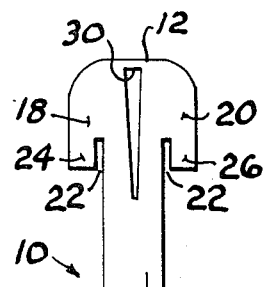
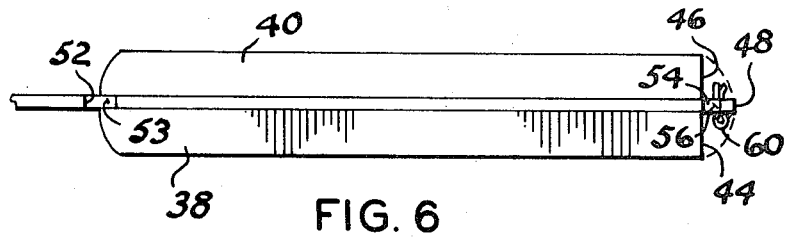
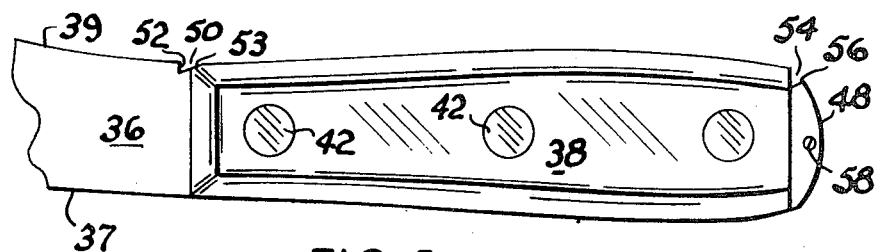
JULIAN G. SMITH
*INVENTOR.*
Robert K. Rhea
AGENT

United States Patent Office 3,538,605
Patented Nov. 10, 1970

---

3,538,605
CLIP-ON HAND GUARD FOR KNIVES
Julian G. Smith, 4405 NW. 16th Place,
Oklahoma City, Okla. 73107
Filed Apr. 25, 1968, Ser. No. 724,134
Int. Cl. B26b 29/00
U.S. Cl. 30—295     3 Claims

ABSTRACT OF THE DISCLOSURE

A stainless steel substantially U-shaped member having a slot adjacent its respective leg end portions surrounds a butcher knife blade at the respective ends of its handle. Side walls of one leg portion form a socket which is fulcrumed against the knife handle to resiliently maintain the other leg of the member engaged with the blade at the free end of the handle.

BACKGROUND OF THE INVENTION

The present invention relates to meat inspector's knives and more particularly to a clip-on hand guard for the handle thereof.

Meat inspectors usually use one or the other of two types of knives for inspecting carcasses. These two types of knives are commonly referred to as "butcher's sheep knife" or "butcher's skinning knife." The principal difference between the two knives is in the shape of the blade. In both knives the blade is coextensive with the handle thereof which is formed in two sections and attached to opposing sides of the handle end of the knife blade. These knives are necessarily kept sharp and, when used in inspecting meat, the buried tip end of the blade sometimes strikes an object, such as a bone, while the knife is being inserted into the meat tending to cause the inspector's hand to slip off the handle and along the blade resulting in cutting his fingers.

It, therefore, appears obvious that a hand or finger guard should be used in connection with the knife as a safety feature to prevent cutting the user's hand. Such a guard is preferably of the type which can be removably connected with an existing knife and that it be made of sturdy material which is easily kept clean and in a sanitary condition such as stainless steel.

The patent to Miller No. 542,568 discloses a knife hand guard of a loop type but this guard is permanently connected at one end with the handle of the knife and is thus not easily changed from one knife to another. The patent to Zullo No. 2,901,824 discloses a finger guard for knives which is removably connected with the knife at the juncture of the blade with its handle. The guard of this patent relies on a knife blade which extends laterally of the handle at one side for maintaining the guard in place.

The present invention is formed from a single strip of stainless steel material, having a slot at its respective ends which cooperatingly surrounds the knife blade at the respective ends of the handle and is fulcrumed against the handle, at its forward end portion, to maintain the other end of the guard in resilient contact with a protruding portion of the blade. The guard is easily disconnected from the knife for cleaning purposes.

SUMMARY OF THE INVENTION

An elongated strap-like section of stainless steel is provided with a knife blade receiving slot adjacent each of its ends. The strap is bent to a generally U-shape and side edges of one end of the strap are bent at right angle to form a knife handle end portion receiving socket which is fulcrumed against the knife handle by the other end of the strip to maintain it connected with the knife blade at the free end of its handle. A portion of the knife handle is cut away at its end portion opposite the protruding blade and the marginal edge of the blade, at its side opposite the cutting edge, is provided with a substantially V-shaped notch at the respective ends of the handle which engages an end portion of the respective slot. Thus the guard may be quickly and easily connected with and removed from a knife and is resiliently held in place during use and while being used extends transversely across the fingers of the user forming a closed loop, in combination with the knife handle, which prevents slippage of the user's hand with respect to the handle.

It is, therefore, the principal object of this invention to provide a clip-on type hand guard for meat inspector's knives.

BRIEF DESCRIPTION OF THE DRAWING

FIG. 1 is a perspective view of the guard, per se;
FIG. 2 is a side elevational view of the guard, to a smaller scale, when connected with a knife, illustrating by dotted lines, the resilient spring-like action of the guard when being connected to, or disconnected from, the knife;
FIG. 3 is a top view of FIG. 2;
FIG. 4 is a stamped-out blank or pattern view from which the guard is formed;
FIG. 5 is a fragmentary side elevational view, to a different scale, of the handle portion of a butcher's sheep knife modified for receiving the guard, and,
FIG. 6 is a top view of FIG. 5.

DESCRIPTION OF THE PREFERRED EMBODIMENT

Like characters or reference designate like parts in those figures of the drawings in which they occur.

In the drawings:

The reference numeral 10 indicates the device, as a whole, comprising a generally U-shaped section of strap metal, preferably formed from stainless steel. The device 10 has substantially parallel leg end portions 12 and 14 defining a curved bight portion 16. The length of the leg end portion 12 is substantially less than the length of the leg end portion 14 for the purposes presently explained.

The guard 10 is preferably stamped-out in pattern form (FIG. 4). The transverse width of the major portion of the guard is substantially equal to the thickness of the knife handle it is to be used on and its length is approximately four inches greater than the length of the knife handle. The leg end portion 12 is provided with integral lateral wings 18 and 20 which are separated, at one end portion, from the bight portion 16 by slots 22 to form tabs 24 and 26, at the respective ends of the wings projecting toward the leg end portion 14, so that the wings 18 and 20 may be cooperatively turned at right angle to the plane of the leg end portion 12 to project toward the leg portion 14. The tabs 24 and 26 are then turned inwardly at right angle to the plane of the respective wing thus forming a knife handle receiving socket 28 for the reasons hereinafter explained.

Adjacent its free edge the leg 12 is provided with a longitudinally extending slot 30 which converges toward the leg end 14 having a width and length for cooperatingly receiving a knife blade. The other leg end portion 14 is provided with a rectangular longitudinally extending knife blade receiving slot 32 adjacent its free end edge.

Referring now more particularly to FIGS. 2, 3, 5 and 6, the reference numeral 35 indicates a conventional butcher's knife having a blade portion 36 coextensive with and sandwiched between handle members 38 and 40 which are held in place by rivets 42. One edge 37 of the blade is sharpened while its opposite or back edge surface is transversely flat.

As shown more clearly by FIGS. 5 and 6, the blade 36 and handle members 38 and 40 are modified for receiving the guard 10. This is accomplished by cutting away a portion of the rearward end of the handle members opposite the protruding blade portion to form a pair of transversely aligned shoulder-like end surfaces 44 and 46 on the respective handle members 38 and 40 with the area cut away being indicated by dotted lines thus exposing an arcuate end portion 48 of the blade. The handle end surfaces 44 and 46 are perpendicular to the longitudinal axis of the knife handle members. A notch 50 is cut into the back edge surface 39 of the blade 36, adjacent its juncture with the forward end of the handle members, to define a shoulder 52, perpendicular to the longitudinal axis of the knife, and an inclined rearwardly directed surface 53. Similarly, the knife blade rearward end portion 48 has a notch 54 formed in its back surface 39 to define an inwardly tapering notch edge surface 56. The purpose of the notches 50 and 54 is to receive and nest that portion of the guard leg end portion between the respective free end of each leg 12 and 14 and the respective slot 30 and 32.

As shown in FIGS. 2 and 3, the knife blade 36 is longitudinally inserted into the tapered slot 30 from that side having the socket 28. The socket 28 cooperatingly nests the forward end portion of the handle members 38 asd 40 with the tabs 24 and 26 contacting the depending surface, as shown in FIG. 2, of the respective handle members. The other end portion 14 of the guard then assumes the dotted line position of FIG. 2 so that the knife handle and bight portion of the guard may be grasped to spring the leg end portion 14 of the guard toward the free end of the knife handle wherein the resilience of the material snaps the leg end member 14 into face to face contact with the handle end surfaces 44 and 46 while the slot 32 cooperatingly receives the blade end portion 48. Since the leg member 14 and bight portion 16 are fulcrumed against the knife handle members, by the contact of the tabs 24 and 26 against the handle members, the resilience of the material maintains the slot 32 engaged with the handle end notch 54 while the notch shoulder 52 bears against the forward surface, as shown in FIGS. 2 and 3, of the leg end member 12.

As shown more clearly in FIG. 2, the bight portion 16 of the guard, at its juncture with the leg end member 14, is spaced a substantial distance away from the knife handle to provide ample room for the user's fingers, not shown, while the other end portion of the bight portion 16 converges toward the adjacent edge of the knife to avoid forming a shoulder-like end portion at this end of the guard which would be inconvenient during use.

OPERATION

The operation of the device seems obvious from the above discription. Its removal from the knife is accomplished by springing the leg member 14 outwardly from the handle end surfaces 44 and 46 wherein the resilience of the material, when the slot 32 is released from the notch 54, springs the guard to the dotted line position (FIG. 2) so that the blade 36 may be longitudinally removed from the slot 30. As an added safety feature, the blade end portion 48 may be transversely apertured, as at 58, adjacent its free edge for receiving a cotter pin 60, or the like (FIG. 6), to prevent accidental removal of the leg member 14 during use.

Obviously the invention is susceptible to some change or alteration without defeating its practicability, and I therefore do not wish to be confined to the preferred embodiment shown in the drawings and described herein.

I claim:
1. A handle guard for a butcher knife, said knife having a handle and having a blade projecting beyond both ends of the handle, said blade having a sharpened edge, comprising: a generally U-shaped strip having substantially parallel leg end portions, each said leg end portion having a longitudinally extending blade receiving slot; and, a wing member formed on each side of one leg end portion of said strip forming a knife handle end portion receiving socket bearing against said knife handle adjacent said sharpened edge and forming a fulcrum tending to urge the other said leg end portion of said strip away from said blade.

2. Structure as specified in claim 1 in which said knife blade is provided with an unsharpened back edge opposite said sharpened edge, said back edge having a notch formed therein at the respective ends of said handle for nesting that portion of the respective said leg end portion between its end surface and the respective slot therein.

3. Structure as specified in claim 2 in which the end portion of said blade projecting beyond said handle opposite said socket is provided with a transverse aperture, and a pin extending through the aperture for locking said guard on said knife.

References Cited

UNITED STATES PATENTS

| | | | |
|---|---|---|---|
| 542,568 | 7/1895 | Miller | 30—295 |
| 416,849 | 12/1889 | Neale | 30—323 X |
| 1,052,316 | 2/1913 | Cihucki | 30—295 X |
| 2,901,824 | 9/1959 | Zullo | 30—295 |

FOREIGN PATENTS

| | | |
|---|---|---|
| 576,427 | 5/1924 | France. |

ROBERT C. RIORDON, Primary Examiner

J. C. PETERS, Assistant Examiner